United States Patent [19]

Nosker

[11] Patent Number: 4,721,366
[45] Date of Patent: Jan. 26, 1988

[54] ILLUMINATION OF A LIQUID CRYSTAL DISPLAY

[75] Inventor: Richard W. Nosker, Princeton, N.J.

[73] Assignee: RCA Corporation, Princeton, N.J.

[21] Appl. No.: 784,960

[22] Filed: Oct. 7, 1985

[51] Int. Cl.[4] .............................................. G02F 1/13
[52] U.S. Cl. ................................. 350/345; 350/347 R; 350/348
[58] Field of Search ..................... 350/345, 347 R, 348

[56] References Cited

U.S. PATENT DOCUMENTS

| | | | |
|---|---|---|---|
| 3,653,138 | 4/1972 | Cooper | 40/130 R |
| 3,653,745 | 4/1972 | Mao | 350/160 R |
| 3,654,606 | 4/1972 | Marlowe et al. | 340/166 |
| 3,797,914 | 3/1974 | Aiken | 350/160 LC |
| 3,863,246 | 1/1975 | Trcka et al. | 340/324 R |
| 3,869,195 | 3/1975 | Aldrich et al. | 350/160 LC |
| 3,920,311 | 11/1975 | Tsuda et al. | 350/345 |
| 3,957,351 | 5/1976 | Stockwell | 350/160 LC |
| 4,051,465 | 9/1977 | Brody | 340/173.2 |
| 4,171,874 | 10/1979 | Bigelow et al. | 350/345 |
| 4,195,915 | 4/1980 | Lichty et al. | 350/345 |
| 4,252,416 | 2/1981 | Jaccard | 350/345 |
| 4,264,147 | 4/1981 | Baur et al. | 350/345 |
| 4,330,813 | 5/1982 | Deutsch | 362/244 |
| 4,349,817 | 9/1982 | Hoffman et al. | 340/784 |
| 4,379,621 | 4/1983 | Ikedo et al. | 350/392 |

FOREIGN PATENT DOCUMENTS 0017339  2/1981  Japan ................................... 358/236

OTHER PUBLICATIONS

Chabicovsky et al, "Liquid Crystal Cell with Special Electrodes for the Generation of Uniform Colors by Optical Birefringence," *Conference Record of the* 1976 *Biennial Display Conference of the SID*, Oct. 1976, pp. 61-63.
Allan, F. V., "The Optimization of Twisted Nematic Display Thickness," *Information Display: The Official Journal of the SID*, Oct. 1983, pp. 14-16.
M. Yamano et al., IEEE Transactions on Consumer Electronics Devices, CE-31, No. 1, Feb. 1985, pp. 39-46.
B. J. Lechner et al., Proceedings of the IEEE, 59, No. 11, Nov. 1971, pp. 1566-1579.
E. S. Schlig, IBM Technical Disclosure Bulletin 16, No. 5, Oct. 1973, pp. 1440-1441.
D. Meyerhofer, Journal of Applied Physics, vol. 48, No. 3, Mar. 1977, pp. 1179-1185.
C. H. Gooch et al., Electronic Letters, vol. 10, No. 1, Jan. 10, 1974, pp. 2-4.

*Primary Examiner*—John K. Corbin
*Assistant Examiner*—Martin Lerner
*Attorney, Agent, or Firm*—E. M. Whitacre; D. H. Irlbeck; L. L. Hallacher

[57] ABSTRACT

The invention is an improved arrangement for illuminating a liquid crystal cell which provides a significant increase in the range of viewing angles in a plane orthogonal to the principal viewing plane which is defined as the plane containing the director at the midpoint of the liquid crystal and the normal to the light entry surface. The improvement comprises means for illuminating the cell having a substantially collimated beam in the orthogonal plane. Preferably, the thickness of the liquid crystal in the cell corresponds to the first Gooch-Tarry minimum. The invention is also a method for providing a wide angle for a liquid crystal display comprising the step of illuminating a liquid crystal cell with a beam of light which is substantially collimated in the principal viewing plane and which is substantially uncollimated in an orthogonal plane.

8 Claims, 8 Drawing Figures

ILLUMINATION OF A LIQUID CRYSTAL DISPLAY

The invention relates to an improved arrangement and method for illuminating a liquid crystal cell in a display to provide larger viewing angles.

BACKGROUND OF THE INVENTION

A liquid crystal display includes a liquid crystal cell and means for illuminating the cell. The liquid crystal cell typically includes a pair of light transmissive substrates with an optically anisotropic liquid crystal material therebetween. The surfaces of each substrate which face the liquid crystal typically have thereon patterned light transmissive electrodes and are also treated, typically by rubbing or by slant evaporation of a dielectric material, to preferentially align the liquid crystal material adjacent to the surfaces.

The properties of the liquid crystal with its long range order are like those of a uniaxial crystal and are described by a director, a unit vector defined as the local average direction of the molecules. The orientation of the director adjacent to a treated surface is typically in the direction of the rubbing or towards the evaporation source. The director may also have a tilt bias, that is, an angle between the director and the substrate surface depending upon the technique used to provide the orientation.

In a twisted nematic cell the substrate and the nematic liquid crystal are typically assembled so that the directors adjacent to the two surfaces are at a non-zero angle, preferably at a right angle, to one another. The liquid crystal between the plates then adjusts so that the director rotates uniformly from the orientation at one surface to that at the other surface. Light polarized parallel or perpendicular to the director at one surface undergoes an optical rotation in passing through the liquid crystal with its plane of polarization being rotated by the twist angle. Plane polarizers oriented parallel to the projection of the director onto each substrate surface will then provide substantially complete transmission of the incident polarized light. Application of a voltage greater than the threshold voltage between the electrodes will cause the director to tilt toward the direction perpendicular to the substrate surfaces, the homeotropic alignment, thereby reducing the optical rotation and causing the light transmission, in the ideal case, to decrease towards zero. The converse of this polarizer arrangement, namely parallel polarizers provides an increase in the transmitted light with applied voltage.

For a small area, essentially personal display the required viewing angle is small. However, in a larger area display, such as a television display, wider viewing angles are desirable in both the vertical and, particularly, in the horizontal plane, relative to the display normal. However, with known techniques the useful range of viewing angles is limited because light rays passing through the cell at different angles experience differing optical birefringence. In particular, the electro-optic curve, which describes the change in the transmitted light as a function of applied voltage, varies with viewing angle. Light transmission through a picture element (pixel) and thus its grey scale then varies with viewing angle. In the extreme case a contrast reversal is observed with varying viewing angle.

One approach to providing this wider viewing angle is to illuminate the cell with highly collimated light in both the vertical and horizontal planes. A two-dimensional diffuser is then positioned between the cell and the viewer to diffuse the transmitted collimated light, as disclosed in U.S. Pat. No. 4,171,874. This approach is undesirable in many applications since the light source must be substantially a point source with its resulting low illuminance or high energy consumption. Alternatively, a line source, such as a fluorescent tube, which provides a point source in one plane and an uncollimated, substantially Lambertian source in the perpendicular plane has been used. This source provides a higher luminance and can be collimated in one plane. The cell typically is illuminated with the light polarized parallel to the director at the light entry surface, collimated in the vertical plane and uncollimated in the horizontal plane. An image displayed on this cell, however, can be viewed only over a limited range of angles in the plane of uncollimated illumination because of the birefringence effects described above.

Thus it would be desirable to have a liquid crystal display having a wide viewing angle, particularly in the horizontal plane which is greater than that presently available.

SUMMARY OF THE INVENTION

The invention is an improved arrangement for illuminating a liquid crystal cell which provides a significant increase in the range of viewing angles in a plane orthogonal to the principal viewing plane, the principal viewing plane being defined as the plane containing the director at the midpoint of the liquid crystal and the normal to the light entry surface. The improvement comprises means for illuminating the cell having a substantially collimated beam in the principal viewing plane and a substantially uncollimated beam in the orthogonal plane. Preferably, the thickness of the liquid crystal in the cell corresponds to the first Gooch-Tarry minimum.

The invention is also a method for providing a wide viewing angle for a liquid crystal display comprising the step of illuminating a liquid crystal cell with a beam of light which is substantially collimated in the principle viewing plane and which is substantially uncollimated in an orthogonal plane.

DETAILED DESCRIPTION OF THE PREFERRED EMBODIMENTS

In the FIGURES corresponding elements have the same numerical identification.

Figure 1:
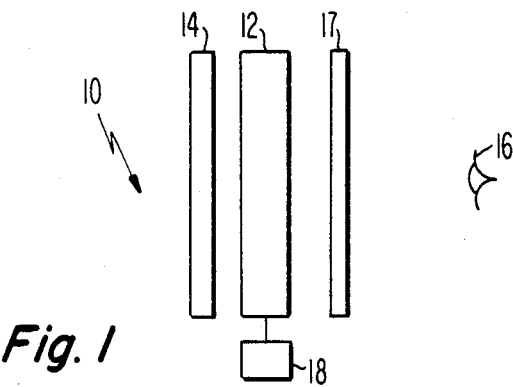
FIG. 1 is a block diagram of a liquid crystal display.

In FIG. 1 a liquid crystal display 10 includes a liquid crystal cell 12 with means 14 positioned adjacent the cell for illuminating the cell in transmission for a viewer 16 through means 17 for diffusing the transmitted light. Means 18 for applying a pattern of electrical signals to modulate the transmitted light corresponding to an image to be displayed thereon are attached to the cell 12.

Figure 2:
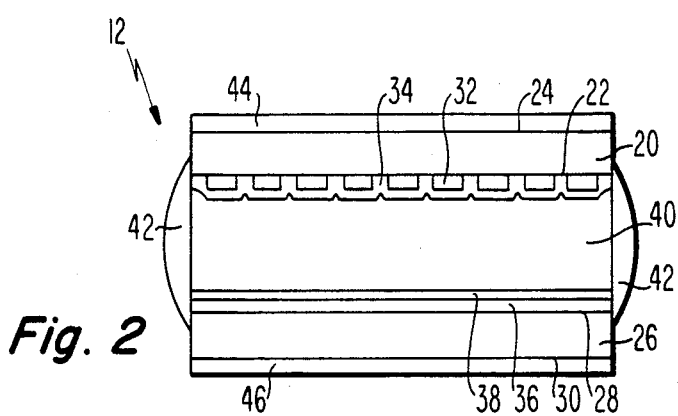
FIG. 2 is a cross-sectional view of a liquid crystal cell.

In FIG. 2 the cell 12 includes a first substrate 20 having first and second major surfaces 22 and 24, respectively, and a second substrate 26 having first and second major surfaces 28 and 30, respectively. A first electrode structure 32 overlies the first major surface 22 of the first substrate 20 and a first alignment layer 38 overlies the structure 32. A second electrode structure 36 overlies the first major surface 28 of the second substrate 26 and a second alignment layer 38 overlies the structure 36. A liquid crystal 40 fills the space between the alignment layers 34 and 38 and a sealant 42 contains the liquid crystal between the substrates 20 and 26. Means 44 for polarizing light incident on the second major surface 24 of the first substrate 20 and means 46 for analyzing the polarized light transmitted through the second substrate 26 are attached to the second major surfaces 24 and 30, respectively. The means 44 and 46 are typically sheet polarizers. Spacers typically used to maintain a uniform spacing between the substrates are not shown.

Figure 3:
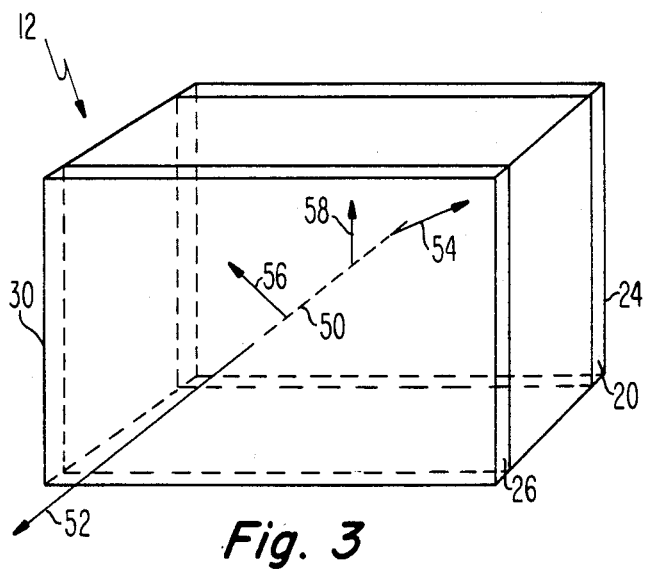
FIG. 3 is a perspective view of the liquid crystal cell illustrating the orientation of the director in the cell.

In FIG. 3 the orientation of the director between the substrates 20 and 26 varies along an optical axis 50 which is collinear with a normal 52 to the second major surface 30. Typically the directors 54 and 56 adjacent the first and second substrates 20 and 26, respectively, are oriented at 90° to one another with the midpoint director 58 being oriented halfway between the orientation of the directors 54 and 56 adjacent the surfaces. The principal viewing plane is defined as the plane containing the midpoint director 58 and the normal 52. The plane of constant electro-optic response is orthogonal to the principal viewing plane and is defined as the plane containing the normal 52 and a line perpendicular to both the midpoint director 58 and the normal 52. The illumination means 14 is positioned so that the light incident on the second major surface 24 is substantially collimated in the principal viewing plane and is substantially uncollimated in the plane of constant electro-optic response. Light incident on the second major surface 24 is preferably polarized either parallel or perpendicular to the director 54 adjacent the first substrate 20 and the analyzing means 46 are preferably oriented to transmit light polarized at 0° or 90° to the polarization of the incident light.

The substrates 20 and 26 are typically composed of a material such as glass which is substantially transparent in the visible wavelength spectrum. The electrode structures 32 and 36 are well-known in the art and are typically composed of tin oxide or indium tin oxide about 100 nanometers (nm) thick which are transparent in the visible wavelength spectrum and which may be deposited by evaporation, sputtering or chemical vapor deposition. These layers are patterned to form the electrodes of individual pixels. The structures 32 and 36 include any associated conductive lines necessary to address the individual pixels and may also include active elements such as diodes, transistors and capacitors used in active addressing of a pixel as disclosed, for example, by Mao in U.S. Pat. No. 3,653,745 and by Marlowe et al. in U.S. Pat. No. 3,654,606, both of which are incorporated herein by reference. Preferably these active elements are small so as to maintain a high optical transmission through the display. The first and second electrode structures 32 and 36 comprise means for modulating the transmission of the liquid crystal 40 in response to a pattern of electrical signals applied thereto. The alignment layers 34 and 38 are preferably composed of a polyimide material about 100 nm thick deposited by spin coating followed by thermal curing. This material is typically treated by rubbing with a cloth in the desired alignment direction.

The liquid crystal is typically a nematic material having a positive dielectric anisotropy and containing a small amount of a cholesteric liquid crystal to insure uniform twist. Preferably a material such as Type No. ZLI-1800-000 or ZLI-2293 nematic material, manufactured by E. Merck, Inc., Darmstadt, Republic of Germany, is used. The liquid crystal is loaded into the cell and the director adjacent the substrate surfaces aligned using techniques well known in the art.

The transmission T, through a cell with a 90° twist angle and parallel polarizers, as disclosed, for example, by Gooch et al. in Electronics Letters, 10, 2 (1974) is:

$$T = \frac{\sin^2 \frac{\pi}{2}(1+x^2)^{\frac{1}{2}}}{(1+x^2)}$$

where $x = 2d\Delta n/\lambda$, d is the material thickness, $\Delta n$ is the difference in the principal refractive indices and $\lambda$ is the wavelength. The transmission of the cell is an oscillatory function of the liquid crystal thickness. This thickness is typically chosen to correspond to a minimum in the transmission of light through the cell. In particular, I have found that a thickness corresponding to the first Gooch-Tarry minimum in the transmission is preferred. This preferred thickness d is $0.87 \lambda/\Delta n$. Typically the thickness is chosen to correspond to the first minimum for a wavelength between 400 and 700 nm. For illumination with a band of wavelengths the wavelength at about the center of the band is preferably used to determine the thickness. Alternatively, the different elements of a pixel corresponding to the different primary colors may have different thicknesses corresponding to the first Gooch-Tarry minimum at the wavelength of the particular primary color.

Figure 4:
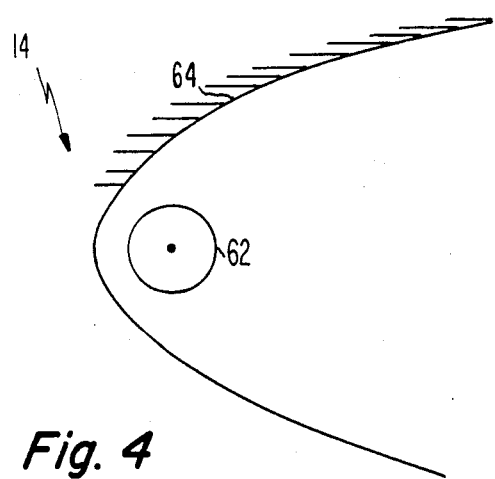
FIG. 4 is a cross-sectional view of a means for illuminating the cell.

The means for illuminating the cell 12 provides a beam of light which is substantially collimated, typically having a divergence half-angle of about 30° or less and preferably less than 15° in one plane, and substantially uncollimated, typically having a divergence half-angle greater than about 45° and preferably approximating a distribution, defined by Lambert's Law in the orthogonal plane. The divergence half-angle is defined as the angle from the center of symmetry of the light beam to its half intensity point. In FIG. 4 a suitable means 14 for illuminating the cell 12 includes a light source 62 mounted in a parabolic reflector 64. The light source 62 is typically a line source such as a fluorescent tube. The parabolic reflector 64 is shaped such that the emitted light is substantially collimated in the plane of FIG. 4 and substantially uncollimated in the orthogonal plane.

The means 17 for diverging the substantially collimated light in the principal viewing plane is typically a cylindrical lenticular screen typically having a pitch of about 50 micrometers (μm) and a full half-circle depth. The closer the screen is placed to the cell 12, the less it will degrade the resolution of the display 10.

Figure 5:
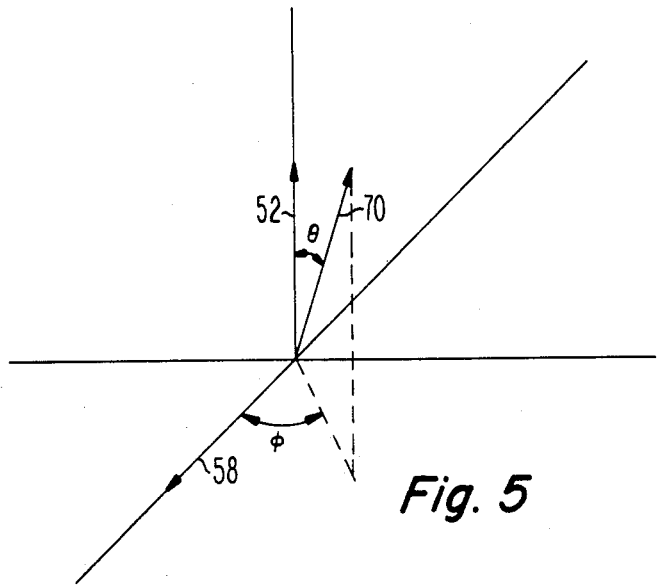
FIG. 5 illustrates the orientation of a light ray transmitted by the cell relative to the coordinate system of FIG. 3.

I have found that, when the incident light is substantially collimated in the principal viewing plane and substantially uncollimated in the orthogonal plane, as described with reference to FIG. 3, the electro-optic curve is substantially constant over a wide range of viewing angles in this orthogonal plane. In FIG. 5 the viewing angles $\theta$ and $\phi$ for a light ray 70 are defined relative to a normal 52 and the orientation of a midpoint director 58. Preferably the collimated light beam in the principal viewing plane is substantially perpendicular to the light entry surface but may be at an angle to this surface. The effect of a non-normal incidence is to shift the electro-optic curve in voltage.

The electro-optic curves were measured on a cell with a Merck ZLI-1800-000 nematic liquid crystal having a refractive index anisotropy $\Delta n=0.08$ with a 90° twist angle and a thickness of 6 or 13.5 μm corresponding approximately to the first and second Gooch-Tarry minima, respectively, at a wavelength of 550 nm. The transmission through crossed polarizers of an incandescent light source was measured at different viewing angles using a detector having an angular resolution less than $\pm 2°$.

Figure 6:
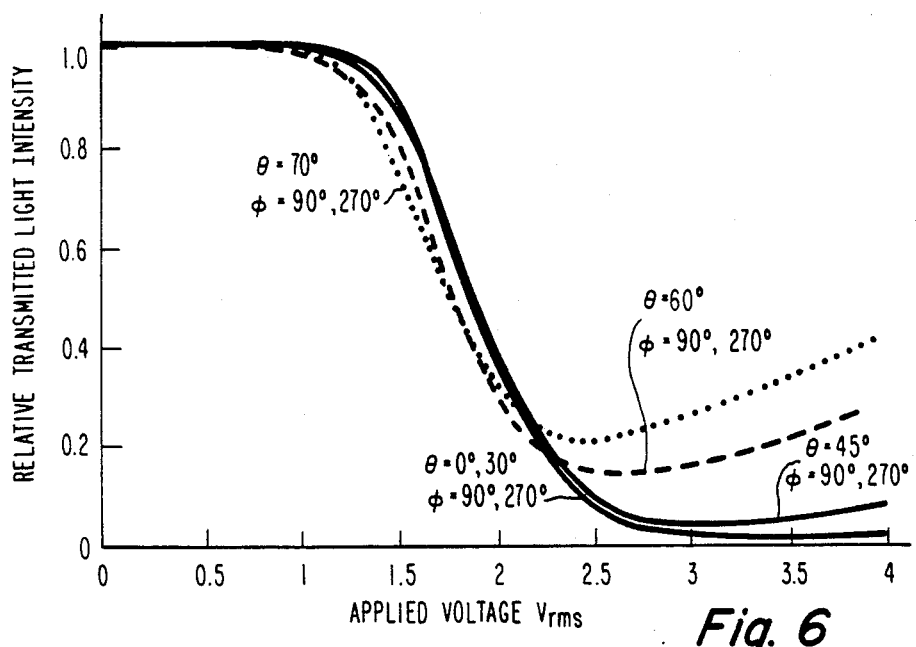
FIG. 6 is a graph of the electro-optic curve in the plane orthogonal to the principal viewing plane at different viewing angles for a cell thickness corresponding to the first Gooch-Tarry minimum.
Figure 7:
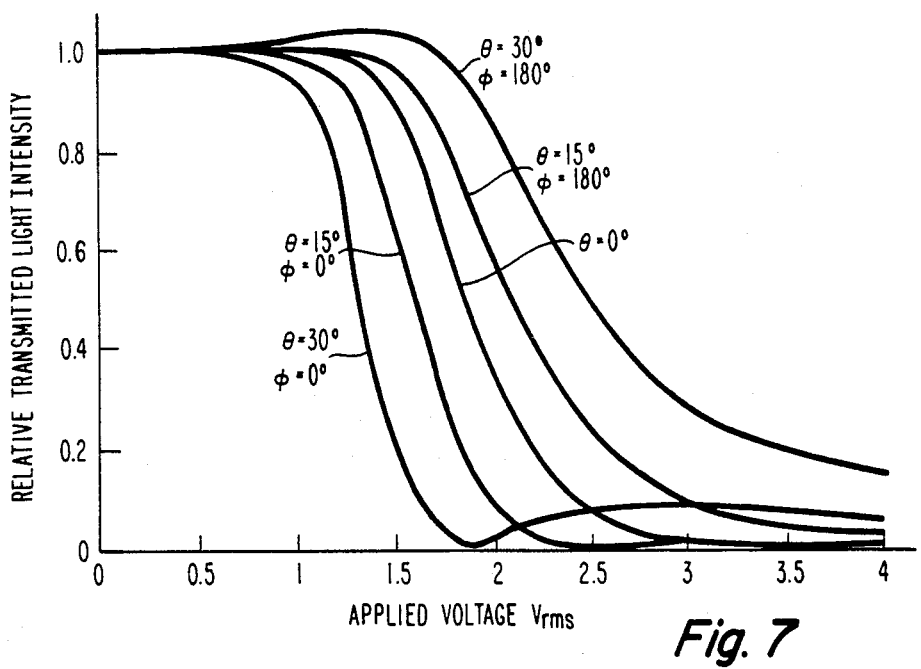
FIG. 7 is a graph of the electro-optic curve in the principal viewing plane at different viewing angles for a cell thickness corresponding to the first Gooch-Tarry minimum.

In FIG. 6 the electro-optic curve in the orthogonal plane ($\phi$ equal to 90° and 270° as defined in FIG. 5) is substantially the same up to a polar angle $\theta$ of about 45° for a cell having a thickness of 6 μm. At polar angles $\theta$ of 60° and 70° the curves are displaced to slightly lower voltages. For all viewing angles the electro-optic curve is symmetrical about the principal viewing plane. In FIG. 7 the electro-optic curve for the same cell in the principal viewing plane ($\phi$ equal to 0° and 180° as defined in FIG. 5) changes markedly with the polar angle $\theta$, exhibiting a greater variation for a 15° change in polar angle $\theta$ than a 70° change produced in the orthogonal plane and is also assymmetrical about the orthogonal plane.

Figure 8:
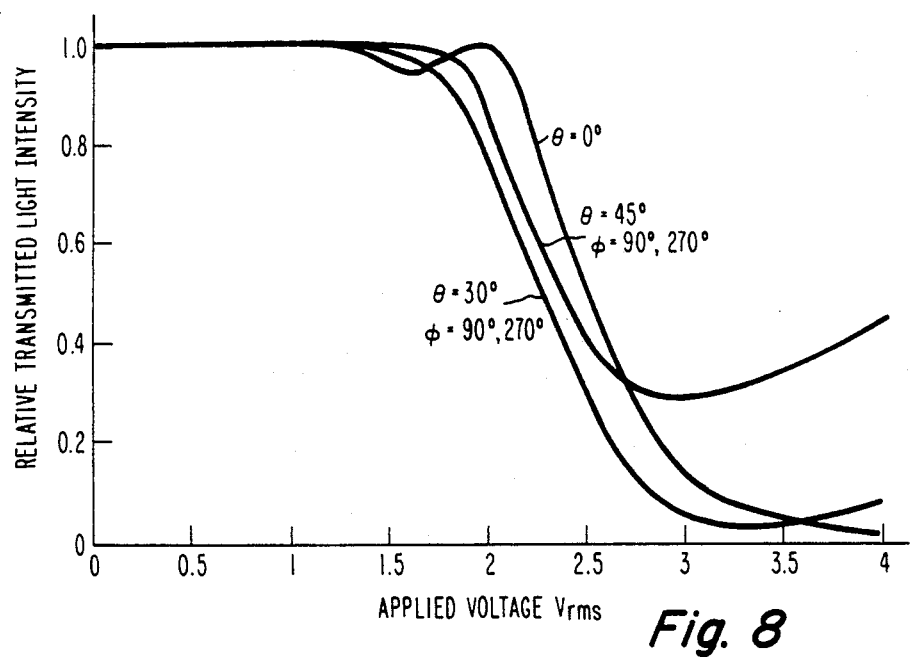
FIG. 8 is a graph of the electro-optic curve in the plane orthogonal to the principal viewing plane at different viewing angles for a cell thickness corresponding to the second Gooch-Tarry minimum.

In FIG. 8 the electro-optic curve for a cell having a thickness of 13.5 μm shows a variation with polar angle $\theta$ which is significantly greater than that for a first minimum cell in the orthogonal direction but which is still much less than that observed in the principal viewing plane for a first Gooch-Tarry minimum cell.

While the principles of the invention have been described in terms of particular embodiments, it is to be understood that the invention is not limited to the details contained therein. In particular the principles of the invention are applicable to twist angles other than 90° and to polarizer orientations other than parallel or perpendicular to the director adjacent the light entry surface. For example, a cell having a 0° twist with the polarizers oriented at 45° to the director is useful.

I claim:

1. In a liquid crystal display including a liquid crystal cell and means for illuminating said cell,
   said cell comprising:
   first and second light transmissive substrates, each having first and second major surfaces, said substrates being disposed such that said first surfaces face one another and said second surface of said first substrate being the light entry surface for illumination of the cell;
   electrode structures on said first major surfaces;
   a liquid crystal between said substrates, said liquid crystal having a directior wherein said cell has a principal viewing plane which contains the midpoint director and a normal to one of said second major surfaces;
   the improvement comprising:
   said means for illuminating said cell providing an output beam which is substantially collimated in said principal viewing plane and which is substantially uncollimated in an orthogonal plane which is substantially perpendicular to said principal viewing plane and contains said normal;
   wherein the thickness of said liquid crystal between said substrates corresponds to the first Gooch-Tarry minimum for said cell at a wavelength between about 400 and 700 nanometers; and
   wherein the angular distribution of the uncollimated light in said orthogonal plane is substantially a Lambert distribution.

2. The display of claim 1 wherein said means for illuminating said cell comprise:
   a light source positioned to illuminate said liquid crystal through said first substrate;
   means for polarizing light incident on said first substrate; and
   means for analyzing the polarized light transmitted through said cell.

3. The display of claim 2 further comprising means for diffusing said substantially collimated light beam in the principal viewing plane after passage through said cell.

4. The display of claim 1 wherein said liquid crystal is aligned so that its director is oriented in one direction adjacent said first substrate and its director oriented in an orthogonal direction adjacent said second substrate.

5. The display of claim 4 wherein said means for illuminating said cell comprise:
   a light source positioned to illuminate said liquid crystal through said first substrate;
   means for polarizing light incident on said first substrate; and
   means for analyzing the polarized light transmitted through said cell.

6. The display of claim 5 further comprising means for diffusing said substantially collimated light beam in the principal viewing plane after passage through said cell.

7. The display of claim 1 further comprising means for applying a pattern of electrical signals corresponding to an image to be displayed to said electrode structures.

8. A method for illuminating a liquid crystal cell comprising a liquid crystal between electrode structures on the surfaces of first and second substrates and having a principal viewing plane which contains the midpoint director of the liquid crystal and a normal to a major surface of one of said substrates,
   said method comprising the step of illuminating said cell with a beam of light which is substantially collimated in said principal viewing plane and which is substantially uncollimated in an orthogonal plane which is substantially perpendicular to said principal viewing plane and contains said normal the thickness of said liquid crystal corresponds to the first Gooch-Tarry minimum for said cell at a wavelength between about 400 and 700 nanometers, and wherein said liquid crystals is aligned so that its director is oriented in one direction adajcent said first substrate and its director is oriented in an orthogonal direction adjacent said second substrate.

* * * * *